Figure 1:
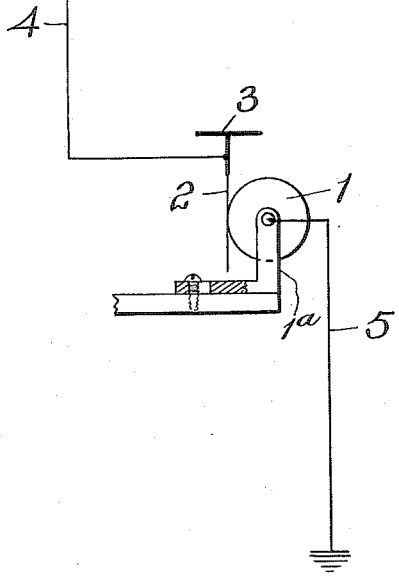

R. A. FESSENDEN.
METHOD OF RECEIVING ELECTROMAGNETIC WAVES.
APPLICATION FILED JULY 14, 1905.

1,044,637.

Patented Nov. 19, 1912.

4 SHEETS—SHEET 1.

WITNESSES:
Herbert Bradley.
Francis Vernaw

INVENTOR
Reginald A. Fessenden
by Dennis L. Wolcott Atty

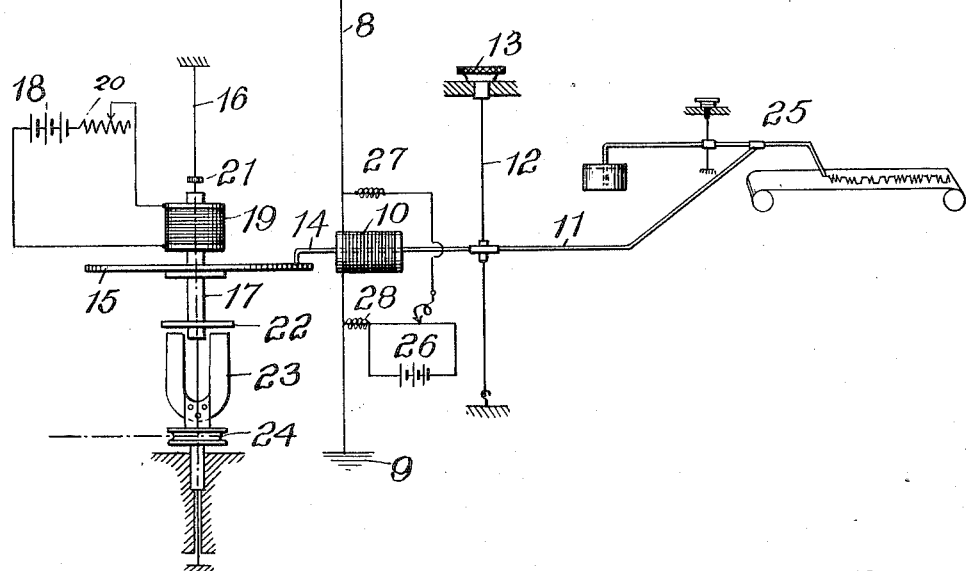
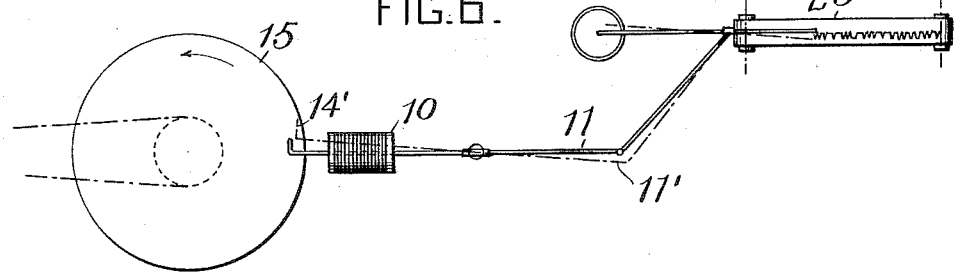
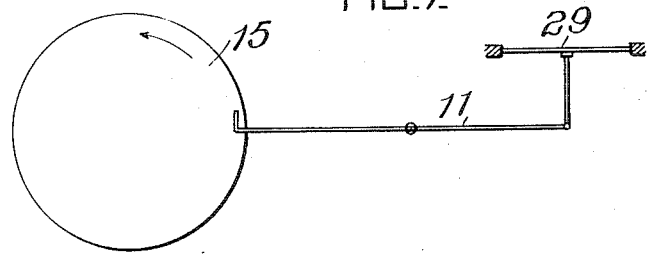

R. A. FESSENDEN.
METHOD OF RECEIVING ELECTROMAGNETIC WAVES.
APPLICATION FILED JULY 14, 1905.
1,044,637.
Patented Nov. 19, 1912.
4 SHEETS—SHEET 3.
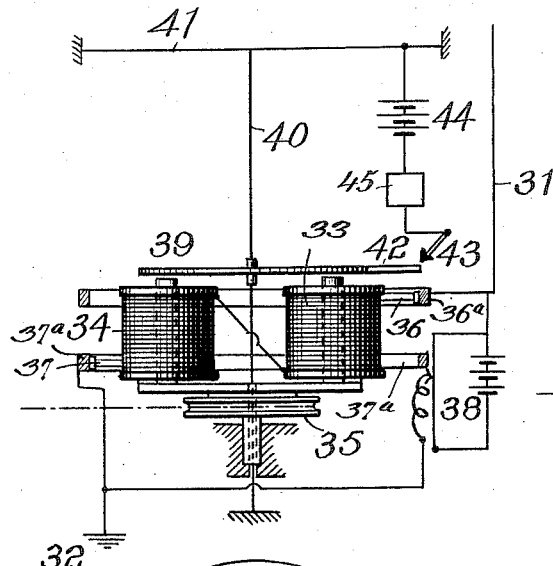
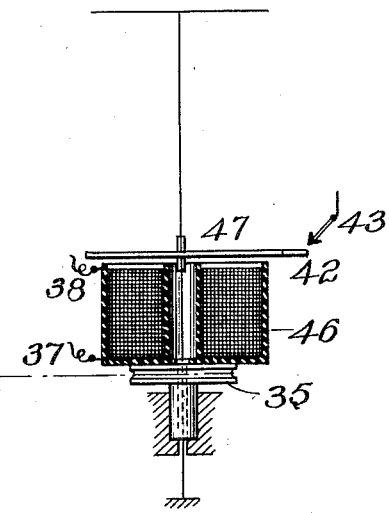
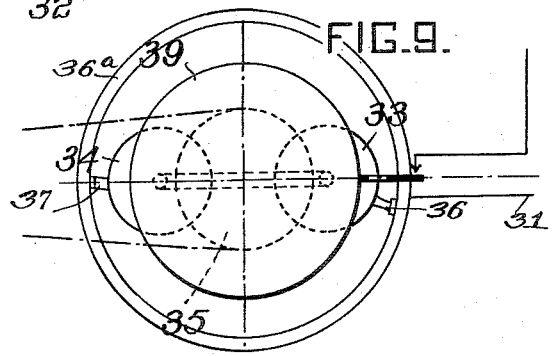
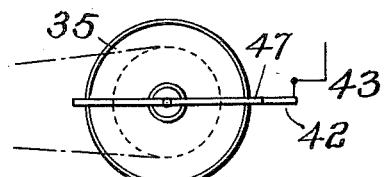
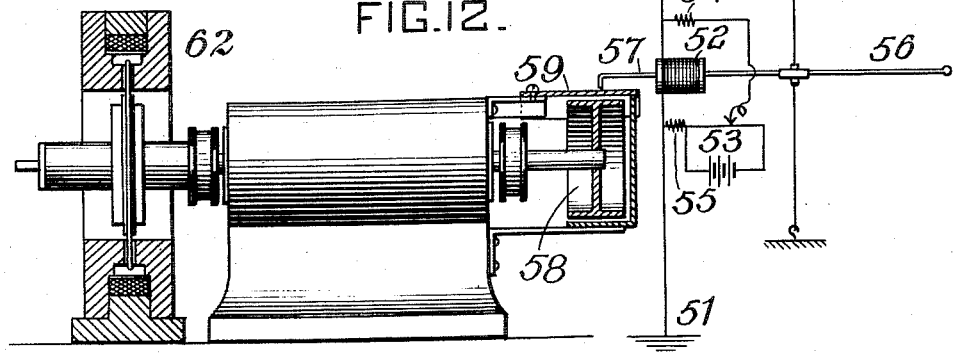
WITNESSES:
Herbert Bradley.
Francis Vernon.
INVENTOR
Reginald A. Fessenden
by Darwin L. Wolcott Atty R. A. FESSENDEN.
METHOD OF RECEIVING ELECTROMAGNETIC WAVES.
APPLICATION FILED JULY 14, 1905.

1,044,637.

Patented Nov. 19, 1912.
4 SHEETS—SHEET 4.

WITNESSES:
Herbert Bradley.
Francis Osmond.

INVENTOR
Reginald A. Fessenden
by Darwin S. Wolcott Atty

UNITED STATES PATENT OFFICE.

REGINALD A. FESSENDEN, OF WASHINGTON, DISTRICT OF COLUMBIA, ASSIGNOR TO THE NATIONAL ELECTRIC SIGNALING COMPANY, OF PITTSBURGH, PENNSYLVANIA, A CORPORATION OF NEW JERSEY.

METHOD OF RECEIVING ELECTROMAGNETIC WAVES.

1,044,637.    Specification of Letters Patent.    Patented Nov. 19, 1912.

Original application filed March 22, 1905, Serial No. 251,538. Divided and this application filed July 14, 1905. Serial No. 269,647.

*To all whom it may concern:*

Be it known that I, REGINALD A. FESSENDEN, residing at Washington, in the District of Columbia, a citizen of the United States, have invented or discovered a certain new and useful Method of Receiving Electromagnetic Waves, of which the following is a specification.

The invention herein described relates to receivers for wireless signaling and more particularly to a new type of receiver in which the waves are caused to produce directly mechanical effects instead of producing direct electrical effects such as changing the conductivity or continuity of a local circuit, and to securing the necessary persistence of effect, this application being a division of my co-pending application No. 251,538, filed March 22, 1905.

More particularly still it relates to a new type of receiver in which the waves are caused to act directly upon moving bodies in frictional relation to vary such relation. The specific factor of tractional effect which is varied directly by the electro-magnetic waves is that known technically as the amount of friction.

My invention therefore involves at least two conductors, one of them preferably a solid, arranged to develop tractional stress with or without contact of the parts, transmitting or tending to transmit motion; the modifications of such stress by the electromagnetic wave and finally the utilization of the change of stress to directly or indirectly produce a signal or indication. While the bodies between which the frictional stress is developed may be normally at rest and the change of stress be utilized, as by movement of one or both of them, to produce the desired indication or signal I prefer to develop said stress between relatively moving bodies between which there is a tractional effect causing one of them to tend to move the other, such tendency being opposed and partially counterbalanced by stress in the opposite direction. In such an arrangement friction causes actual movement of one of the bodies in the direction of the other in proportion to the amount of the friction and the counterbalancing force acting in the opposite direction. Any variation in friction by the action of the electro-magnetic waves, whether increase or decrease, will unbalance the normally balanced forces and cause bodily movement of the normally balanced member either in the direction of the frictional stress or in the direction of a counterbalancing force according as the effect of the electro-magnetic waves is to decrease or increase the total amount of friction. In most cases I prefer to arrange matters so that the total amount of friction will be increased by effecting an increase in the value of the factor known as the coefficient of friction, or the pressure or the magnetic friction.

Figure 13:
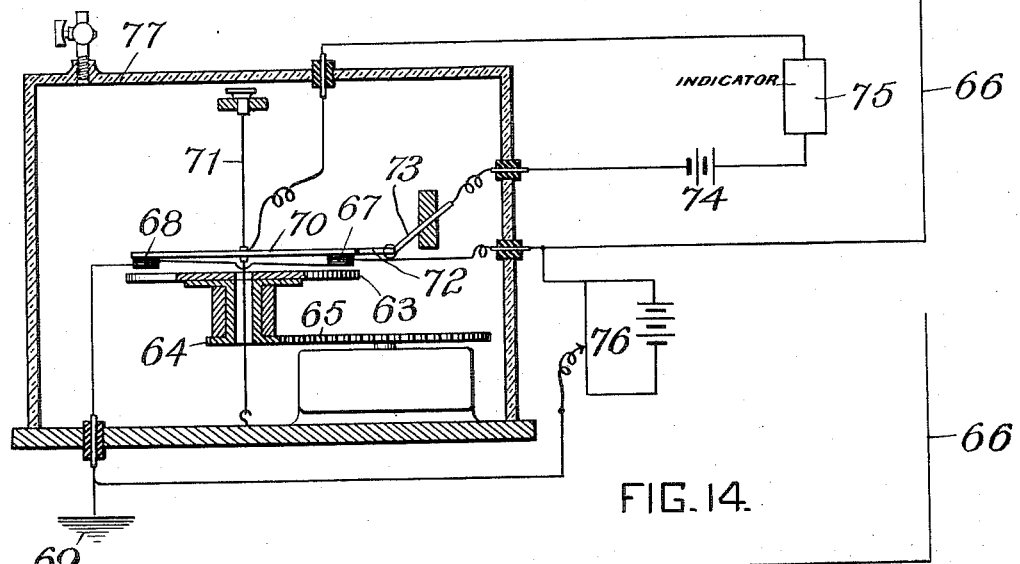
Figure 14:
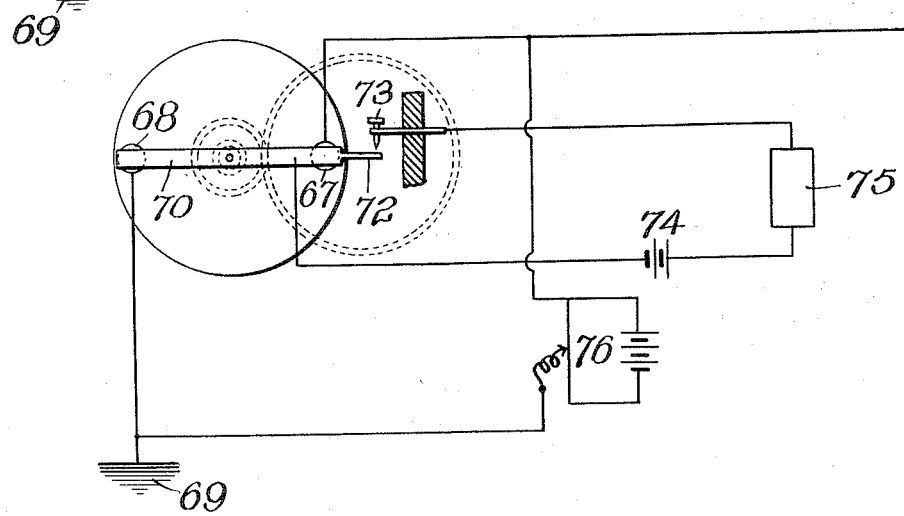

Figures 1, 2, 3 and 4 of the drawings show partly in diagram certain forms in which I have contemplated embodying my invention. They also show similar forms in which the persistence of effect necessary to practical operation is secured. Figs. 5 to 11 show other forms. Fig. 12 is a view partly in section and partly in elevation illustrating a modification of my improvement; Figs. 13 and 14 show in elevation and plan a further modification of the invention.

In Fig. 1 I have shown the frictional stress as developed between a rotating wheel 1, which may be driven by clockwork or by an induction or other motor and a body 2 resting against 1 and tending to follow the direction of movement of the latter but restrained and counterbalanced in such movement by the diaphragm 3 with which it is connected. This diaphragm is preferably very thin and correspondingly delicate. The rotating wheel 1 may be made of silver, nickel, 10 per cent. bismuth-gold alloy or other suitable material and the body 2 may be a piece of thin gold leaf, though I do not confine myself to this particular material as amalgamated copper foil may be used especially when amalgamated copper is used for the wheel. This receiver is operatively connected in any desired receiving circuit, as for example, by connecting the body 2 to the vertical 4 and the wheel to the ground connection 5. In operation the wheel 1 is rotated and the body 2 resting against its periphery is pulled or pushed as the case may be in the direction of movement of the wheel to an extent depending upon the co-efficient of friction of the surfaces of the bodies and the pressure with which one is forced against the other. This pressure may be suitably adjusted by gravity, as by shifting the position of the wheel support 1ª, or by magnetism or in any other suitable way. The telephone diaphragm 3 by reason of its connection with the body 2 will be displaced by an average amount depending upon the pull or push exerted by the wheel upon the latter and the amount of the counter balancing force, the latter being determined in this case by the elastic reaction of said diaphragm 3. With the parts in this normal condition the incidence of the electro-magnetic waves will change the amount of friction between the body 2 and the wheel 1 thus leaving the body 2 unbalanced as against the pull of the elastic diaphragm 3. This will cause a sudden change in the position of the diaphragm which may be used to effect an indication either by direct action upon the air to produce a sound or it may be utilized to control the operation of any desired apparatus or medium. Used to operate directly upon the air to produce sound, it has produced good results.

Figure 2:
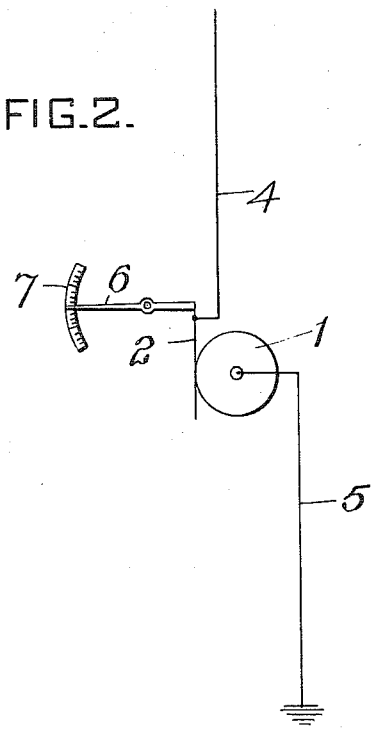

Many other forms of mechanism adapted to give an indication upon movement in response to a slight change in push or pull may be employed. For instance, a form is shown in Fig. 2 similar to Fig. 1 with the exception that instead of a diaphragm a pointer 6 and scale 7 are used for an indicating mechanism.

Figure 3:
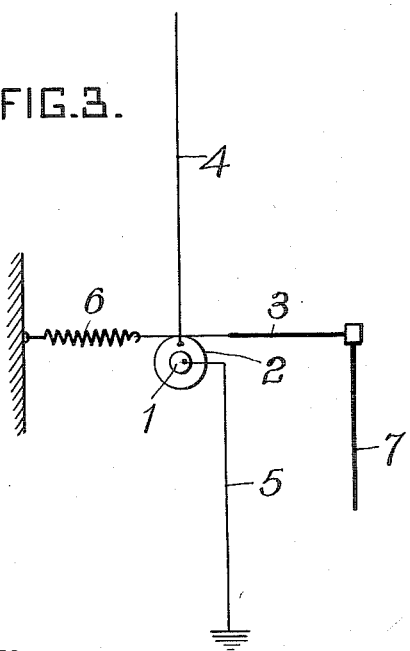

Fig. 3 shows a third form, in which is a rotating shaft 1 upon which rests the collar 2 carrying the fine thread 3 attached to the siphon 7. 6 is a spring which holds the collar from rotating with the shaft 1. 4 is a vertical which may be attached to the collar and 5 is a ground which may be attached to the rotating shaft 1. In operation the shaft 1 rotates, and drags the collar 2 with it until the frictional force is equal to the restoring force of the spring 6. On the passage of electrical waves the co-efficient of friction is increased and the collar 2 is displaced from its mean position, thereby causing the siphon 7 to produce an indication.

Any suitable lubricating fluid whether electrolyte or not may be used between the collar and shaft, for example oils of various degrees of viscosity and of electrical conductivity, depending upon the character of the work for which the receiver is to be used. Glycerin or graphite may be used also, either in the forms shown in Fig. 3 or in the other forms.

Figure 4:
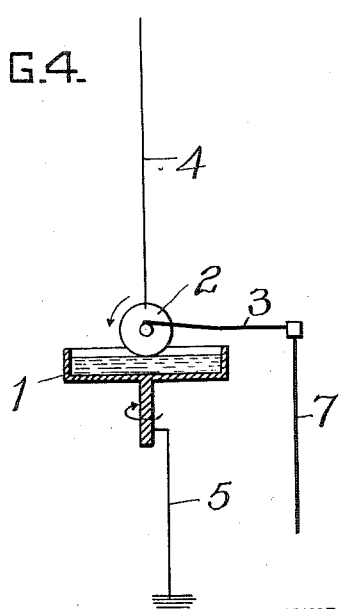

In Fig. 4 I have shown a form wherein one of the conducting bodies between which tractional stress is developed is a fluid. Mercury or water for example may be used in this form and the mercury may be in continuous motion and may be used to displace the position of the wheel a normally constant amount depending upon the tractional effects and the counterbalancing force. As in the other cases the amount of the displacement is varied upon receipt of the waves. As shown in Fig. 4 this principle is embodied in a device wherein a rotating cup contacting with which is contains mercury, bodied in a device wherein a rotating cup an amalgamated copper disk 2. Usually the mercury is covered with a film of insulating material as for example, oxid or air. The traction of the mercury upon the disk 2 may be counterbalanced by the spring of the wire connection to the aerial 4 or in any desired manner. The rotating cup is connected to the ground 5. The change of traction of the disk 2 upon receipt of the waves may be utilized to produce an indication in any desired way, the means employed in connection with the collar 2 of Fig. 3 being appropriate.

In Fig. 5 is shown another embodiment of the invention in which the highly oscillating currents to be detected act to produce a magnetization, which magnetization in turn produces an alteration in the friction. In this figure, 8 is an antenna grounded at 9, and having in series with it a coil 10, so that the highly oscillatory currents pass through this coil. 11 is a very fine iron wire, which may be 1/1000 of an inch in diameter, supported by a quartz fiber 12, which latter is adjustable by a milled nut 13. The fine iron wire 11, is preferably bent at one extremity 14, so as to be in light contact with the rotating disk 15, which may be of any magnetic material, for example it may be of brass covered with a plating of nickel or iron. This disk is preferably ground so as to be very true before and after plating with nickel. The rotating disk may be supported and driven in any suitable manner, for example by a magnetic suspension, as shown, where 16 is a wire, 17 is a tube encircling the wire, and attached to the disk 15; 18 is a local battery in the circuit of which is a magnetic coil 19; which operates to draw up tube 17, and 20 is an adjustable resistance. 21 is a projection on the wire 16 so as to prevent the tube 17 being drawn up too high. Among other methods of driving the disk, a magnetic drive may be used as shown, where 23 is a rotating magnet driven by a pulley 24 and 22 its armature. The motion of the wire 11 may be used to operate any suitably connected electrical or mechanical mechanism, for example, as shown, the siphon recorder 25. The pressure of the wire 11 on the disk 15 may be adjusted in any suitable way, as for example, by an auxiliary magnet, here shown as an electric magnet, the coil 10 being connected to the potentiometer 26, so that by adjusting the potentiometer the wire 11 can be magnetized to a greater or less degree, and hence made to press more or less heavily on the disk 15. Choke coils 27, 28, are used for preventing the electric oscillations from being shunted through the potentiometer.

Fig. 6 is a plan view of the apparatus where 15 is a disk, 11 the fine iron wire, 10 the coil, 25 the siphon recorder.

Fig. 7 shows the fine wire 11 displaced by the disk 15, and made to operate a telephone diaphragm 29 instead of the siphon recorder. In operating the disk 15 revolves and the needle of the fine wire 11 pressing upon it is displaced, to a greater or less extent, depending upon the friction, as shown in 11' 14', Fig. 6. Upon the receipt of the electrical oscillations by the antenna 8, the wire 11 is still further magnetized and the friction increased, whereby the wire 11 is drawn still farther to one side, and an indication is produced on the siphon recorder 25 of telephone 29.

Figs. 8, 10, show two others forms, 9 and 11 being plan views. In Fig. 8, 31 is the antenna grounded at 32, and the waves pass through two electro-magnetic coils 33, 34, which may have magnetic cores as shown, in which case the cores are formed of very fine iron wire. These cores are caused to revolve by a pulley 35. 36, 37 are sliding contacts in the form of brushes on the coils engaging the fixed rings 36ª, 37ª connected to the leads for leading the highly oscillatory currents and the current from the potentiometer 38 into and out of the coils 33, 34. 39 is a disk supported by the fine wire 40 which is suspended from another fine wire 41. This disk carries a contact arm 42. In operation the magnets 33, 34 revolve and in revolving drag around the disk 39 to an extent depending upon the current flowing from the potentiometer 38 and the resistance to torque presented by wire 40. This current is so adjusted that the contact arm 42 does not make contact normally with the fixed contact 43. When, however, the oscillatory currents flow through from the antenna through the coils 33, 34, the torque or magnetic friction of the disk 39 is altered and the contact arm 42 makes contact with the fixed contact 43, and the current from the local battery 44 flowing through the circuit actuates the mechanism 45, thereby producing an indication.

In Fig. 10 a single annular coil 46 is used instead of the two coils 33, 34, with sliding contacts 37, 38, as before. The annular coil is driven by the pulley 35, and the cylindrical tubes between which the coil 46 is wound are made of insulating material. In this case, instead of the disk 39 a thin iron wire 47 is dragged around by the magnetic friction, this fine iron wire carrying the contact arm 42 and being adapted to make contact as in the case of the mechanism shown in Fig. 8 with the fixed contact 43.

In the plan views shown in Figs. 9, and 11 the numbers have the same significance as in the elevations.

Fig. 12 shows another embodiment of the invention in which 50 is the antenna grounded at 51 and 52 is a coil through which passes the high frequency oscillations and also the current from the potentiometer 53; 54, 55 being choke coils, 56 the fine wire of magnetic material, preferably iron, bent at the point 57, so as to come nearly in contact with the rapidly revolving pulley shaped disk or wheel 58, made preferably of copper and driven by alternator 62, 59 is a very thin piece of mica or glass so arranged as to lie between the surface of pulley 58 and the fine iron wire 57. 60 is a quartz fiber or fine wire supporting the fine iron wire 56; and 61 is a nut for adjusting the position of the fine iron wire. In practice the wheel 58 revolves very rapidly, and the fine wire 56 being magnetized to any extent from zero upward to that desired by means of a potentiometer 53. The action of the rapidly revolving wheel 58 pulls the fine wire 56 to one side, into a steady position, which may be called the zero position. On the passage of the highly oscillatory currents through the coil 52, the magnetization in the iron wire 56 is altered, which in turn alters the amount of the interaction between the revolving wheel 58 and the iron wire 56 so that the position of the iron wire is shifted from zero and an indication is produced either visual, as shown, or mechanical, as shown in Figs. 5 and 7. The object of the thin mica or glass 59 is to prevent the action of the air currents from causing motion to the wire 56, and such a diaphragm may also be used in other forms where actual contact is not necessary to produce the friction, for example, in Fig. 10.

In Fig. 13 is shown another form in which a disk of copper, 63, is mounted on the hollow shaft 64, and driven by a mechanism 65. In this form the oscillatory currents from the antenna 66 flow through the coils 67, 68, to ground at 69. These two coils are supported on a horizontal arm 70 which is in turn supported by a wire 71, and the horizontal arm carries the contact arm 72, adapted to make contact with the fixed contact 73, and thereby close the local circuit through the battery 74, and indicating mechanism 75. A potentiometer 76 may be used to cause a constant current to flow through the coils 67, 68, and thereby adjust the position of the horizontal arm 70. The passage of the high frequency oscillations from the antenna through the coils 67, 68, causes a change in the amount of drag of disk 63, and thereby closes the contacts 72, 73, and operates the indicating mechanism 75.

Fig. 14 is a plan view of the apparatus. The coils 67, 68 and the arm 70 should be as small and light as possible. Instead of using a mica disk as in Fig. 12 to obviate the effect of the air currents, the whole apparatus may be placed in a box 77, from which the air may be pumped so as to produce a vacuum.

The change of friction is not always in the direction of an increase, as in some instances, the friction is decreased, particularly where an electrolyte is employed, as in the Edison chalk cylinder telephone, but it is not practicable to attempt to state a law upon which this depends. I have discovered that the difficulty may be overcome by making the distance passed over by the moving member during the period of action, of sufficient dimensions to produce an indication, and the moving part of sufficiently small inertia. While I do not limit myself to any particular means for doing this, I prefer to accomplish it either by giving great velocity to the moving member, or prolonging the time of action, or preferably by both. In Fig. 12 is shown a convenient means for producing the result in the former method. Here the rotating disk 58 is fastened to the shaft which is capable of being driven at approximately two thousand revolutions per second. In this case if the disk is one inch in diameter, the surface of the disk will move at the rate of approximately six thousand inches per second, and if the spark should last but for one-millionth of a second, the distance passed over by the disk during that time would be nearly one one-hundredth of an inch, which is sufficient to produce an indication on any suitable mechanism such as a relay or siphon recorder. If a train consisting of 20 waves is used the distance passed over will be more than an eighth of an inch, which is, of course, larger than is necessary. This method of rapid motion of the moving parts is not limited to the particular form here shown, but may be used with other forms, either in actual contact as in Fig. 1, or separated by an air shield as in 59, Fig. 12. Means suitable for carrying out the second mentioned method, that is, for prolonging the period of action, are shown in Fig. 12.

While the method of wireless signaling which consists in using relatively low voltage and high intensity current in the aerial is in contradiction to the general practice of other wireless experimenters, it is in accord with my general practice. I have consistently and continuously worked along these lines and have developed a system based on this feature, see for example Letters Patent #706,737 and others. I have discovered that by using a relatively low voltage and high intensity current, such as is obtained for example in the manner set forth in Patent #706,737, from a practically continuous source of oscillations and an antenna of large capacity, very much better results are obtained than by using the customary relatively high voltage and low current intensity. I have discovered that better results are obtained not only as regards increased effect at the receiving station, better selectivity, greater freedom from atmospheric disturbances, less absorption by the atmosphere during daylight, less absorption by obstacles and less trouble from interference, but also that, as is set forth in this and other applications, this method permits of the use of forms of receivers and receiving apparatus, which are not only more sensitive but are free from outside disturbances and possess many other advantages.

No claim is made herein to the apparatus shown and described for carrying out the method, as such apparatus forms the subject-matter of application No. 251,538, filed March 22, 1905, of which application this case is a division.

The particular form of the receiver in which a liquid is used as one of the members in tractional relation, forms the subject matter of a separate co-pending application No. 364,626, filed March 26th, 1907, renewed February 11th, 1909, as No. 477,453, and patented April 6th, 1909, No. 917,574.

I claim herein as my invention:—

1. The method of signaling by means of electromagnetic waves, which comprises varying the tractional stress between relatively moving bodies in tractional relation by means of the current produced by the received electromagnetic waves, and immediately translating such variation of tractional stress into a form of energy whose effects may be observed.

2. The method of signaling by electromagnetic waves which comprises passing the currents produced by the received waves through a contact between conductors arranged in moving tractional relation, whereby to vary the value of the tractional stress, and translating immediately such variation of stress into another form of energy whose effects may be observed.

3. The method of signaling by electromagnetic waves which comprises maintaining two conductors in a condition of moving tractional stress with each other, varying the amount of such stress by passing the received currents through the joint between said conductors and operating an indicator immediately by the effects of the said change of stress.

4. The method of signaling by electromagnetic waves which comprises varying the value of friction between two relatively moving conductors in balanced condition of opposing stresses, and moving one of the said conductors immediately as a consequence of said variation of friction.

5. In wireless telegraphy the method of detecting electromagnetic waves which comprises the variation by the received wave currents of the value of moving friction between two relatively moving electrodes, and translating the resulting physical movement of one of the electrodes into an observable indication during receipt of the waves.

6. The method of indicating the presence of electromagnetic wave currents by maintaining a body in a state of unstable equilibrium under two opposing forces, of which one is moving traction, altering the value of said traction by the received wave currents and transforming the resulting motion of said body into an observable indication.

7. The method of signaling by electromagnetic waves by sending prolonged trains of waves from one station, and at another station maintaining two conductors in a state of equilibrium of position by balancing a constant force with a moving frictional force opposed to it, and changing said position by the effect of the received wave currents in varying the value of said friction during receipt of the waves.

In testimony whereof I have hereunto set my hand.

REGINALD A. FESSENDEN.

Witnesses:
 THOMAS P. BROWN,
 JESSIE E. BENT.